Patented Aug. 26, 1930

1,774,406

UNITED STATES PATENT OFFICE

FRITZ SIMMER, OF LESIENICE, NEAR LEMBERG, POLAND, ASSIGNOR TO AKTIE-SELSKABET DANSK GAERINGS INDUSTRI, OF COPENHAGEN, DENMARK, A JOINT-STOCK COMPANY OF DENMARK

PROCESS FOR THE MANUFACTURE OF SPIRIT AND YEAST, PARTICULARLY BY WORKING UP MOLASSES

No Drawing. Application filed January 13, 1928, Serial No. 246,651, and in Austria January 21, 1927.

The present invention relates to a process of manufacturing spirit and yeast by working up molasses. The invention has for its object the provision of certain improvements in spirit or yeast manufacture resulting in the obviation of difficulties in the biological purification of the waste waters. I have found that this result can be achieved without complicated manufacturing operations or diminution of yield, or deterioration of the quality of the yeast obtained, by avoiding during the entire process of manufacture involving the steps of preliminary purification of the molasses, the adjustment of the hydrogen ion concentration assuring a pure fermentation and the supply of the nitrogenous food the use of primary materials and of auxiliary substances containing inorganic sulfur compounds and particularly $SO_4$-anions.

Hitherto sulfuric acid or sulfates have usually been employed for the purification of molasses intended for the production of yeast. Moreover, sulfuric acid is the preferred acid for producing in the mash or wort the hydrogen ion concentration assuring a pure fermentation. Again the supply of the nitrogeneous food necessary for the yeast is frequently effected by the addition of ammonium sulfate. Therefore a considerable quantity of $SO_4$-ions accumulates in the waste waters of spirit and yeast factories and causes great difficulties, as the sulfates under the action of sulfate-decomposing bacteria are reduced to sulfuretted hydrogen which not only pollutes the air of the neighbourhood, but also poisons the outlet or receiver and disturbs the decomposing action of the bacteria in the biological purification plant. This drawback is obviated in a very simple manner, according to the present invention, by using for acidifying the mash or wort and as nutrients for the yeast, exclusively substances which do not contain $SO_4$-ions.

For purifying the molasses any of the known methods may be employed with the exception of those, in which sulfuric acid or sulfates are to be added. If, however, for any reason during or on account of the purifying process sulfates should come into the molasses or be produced therein, they must be precipitated in the form of an unsoluble salt of sulfuric acid,—for instance the barium salt—and then removed from the molasses by filtration. Molasses, which as the result of manufacturing operations contain other inorganic sulfur compounds, are either not to be used as primary material or must be freed from these impurities.

The necessary hydrogen ion concentration in the mash or wort is preferably produced by the addition of suitable quantities of hydrochloric acid, which, owing to its high degree of dissociation at even moderate dilutions, is particularly adapted for this purpose. In addition thereto the hydrochloric acid exerts a bleaching action on the molasses, the wort and the yeast, so that the concentration of the molasses can be kept comparatively somewhat higher without the color of the yeast being affected. In this way a very pure fermentation is obtained and the production of yeast of a powdery nature is secured. The hydrochloric acid also favorably influences the colloidal properties of the waste waters, so that the latter can be filtered to complete clearness and finally this acid, owing to its high degree of dissociation, expels the weaker organic acids from their salts and in this way also contributes to the facilitation of the purification of the waste waters.

As nutrient salts ammonium chloride, ammonium carbonate, ammonium phosphate etc., may be used, in short any suitable salts not containing $SO_4$-ions.

It has already been variously proposed to secure a pure fermentation by replacing the sulfuric acid by other acids and particularly by hydrochloric acid. In this respect for instance the results of searches and experiments made by Rothenbach are known. Recently Hägglund in his investigations relating to the dependency of fermentation from hydrogen ions and hydroxyl ions also very exhaustively studied the influence of hydrochloric acid on the growth and the fermentative power of yeast. Moreover in respect of the utilization of molasses for producing yeast the acidification of the yeast by means of hydrochloric acid has been recommended by Marbach, but this method was not capable of superseding the usual lactic acid methods. (Cf. Kiby's book "Presshefefabrikation", 1912, page 611). Moreover it is already the general practice to meet the nitrogen requirement of the yeast by the supply of ammonium phosphate, ammonium chloride or ammonium carbonate, the solutions of the last named salt being introduced in a conveniently regulated flow in order to avoid a strongly alkaline reaction or else by extracts obtained from organic material rich in nitrogen (e. g. linseed meal) by treating it with acid. However, the proposal of prescribing the conditions for the entire course of the manufacture, from the point of view of taking into the qualities or properties of the waste waters most favorable for their biological purification and of conducting in accordance thereto the entire manufacturing operations with the object of obtaining waste waters free from $SO_4$-ions, is not only new, but involves also a valuable advance.

It is true that the molasses themselves contain organic sulfur compounds, but the yeast cultivated in a medium free from sulfur is compelled to procure the sulfur necessary for building up its cell substance by taking it from these sulfur compounds, from which, therefore, no sulfur reaches the waste waters.

The spent wash resulting in the present process from working up molasses is also free from sulfates, a fact which is advantageous in respect of its subsequent utilization.

What I claim is:

1. The process of manufacturing spirit and yeast from molasses which comprises preliminarily purifying the molasses, adding hydrochloric acid to adjust the hydrogen ion concentration to an optimum value for pure fermentation, and then adding to the mash a compound of the group consisting of ammonium chloride, ammonium carbonate and ammonium phosphate, whereby waste waters result which are free from sulphur compounds.

2. The process for manufacturing spirit and yeast from molasses which comprises purifying the molasses by the addition of barium chloride and the removal of the resulting precipitate, adjusting the hydrogen ion concentration to an optimum value for pure fermentation and then adding nutrients, the reagents used in the above steps being free from sulphur in any form.

In testimony whereof I have affixed my signature.

Dr. FRITZ SIMMER.